United States Patent

Wacht et al.

[11] Patent Number: 5,978,596
[45] Date of Patent: Nov. 2, 1999

[54] ONE-TIME-USE CAMERA BENDS WIDER FILM LEADER WIDTHWISE TO CONSERVE SPACE

[75] Inventors: Peter A. Wacht, Ontario; Anthony DiRisio, Rochester; Joel S. Lawther, East Rochester, all of N.Y.

[73] Assignee: Eastman Kodak Company, Rochester, N.Y.

[21] Appl. No.: 09/111,229

[22] Filed: Jul. 7, 1998

[51] Int. Cl.[6] .................................................. G03B 17/02
[52] U.S. Cl. ................................................. 396/6; 396/440
[58] Field of Search .............................. 396/6, 440, 441, 396/442, 535, 536, 537

[56] References Cited

U.S. PATENT DOCUMENTS

| | | |
|---|---|---|
| 4,678,305 | 7/1987 | Flitton . |
| 4,685,790 | 8/1987 | Uematsu . |
| 4,956,658 | 9/1990 | Smart . |
| 4,992,812 | 2/1991 | Smart . |
| 5,049,908 | 9/1991 | Murakami . |
| 5,604,555 | 2/1997 | Soshi et al. ............................. 396/440 |
| 5,878,297 | 3/1999 | Asakura et al. .................... 396/440 X |

*Primary Examiner*—Howard B. Blankenship
*Attorney, Agent, or Firm*—Roger A. Fields

[57] ABSTRACT

A one-time-use camera comprises a filmstrip having a certain width and a film leader for the filmstrip having another width that is greater than the width of the filmstrip, a film-exposure backframe opening, a pair of parallel film edge guides located apart from each other a distance substantially equal to the width of the filmstrip to guide the filmstrip over the backframe opening, and a pair of leader edge guides located parallel to the film edge guides and apart from each other a distance less than the width of the wider leader, but greater than the distance separating the film edge guides, in order to make the wider leader be bent widthwise at opposite longitudinal edge portions of the wider leader between the film edge guides and the leader edge guides, whereby the wider leader is prevented from having to significantly increase the size of the one-time-use camera.

6 Claims, 3 Drawing Sheets

5,978,596

ONE-TIME-USE CAMERA BENDS WIDER FILM LEADER WIDTHWISE TO CONSERVE SPACE

FIELD OF THE INVENTION

The invention relates generally to the field of photography, and in particular to one-time-use cameras. More specifically, the invention relates to a one-time-use camera in which the filmstrip has a wider leader in order to facilitate film processing.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable exposure or frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer rotates the manual thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the exposure counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

PROBLEM

The pursuit of compactness in one-time-use cameras is a continuous design goal. This is made more difficult when the filmstrip in the camera has a wider film leader in order to facilitate film processing to develop the negatives and make the prints.

SUMMARY OF THE INVENTION

A one-time-use camera comprising:

a filmstrip having a certain width and a film leader for the filmstrip having another width that is greater than the width of the filmstrip;

a film-exposure backframe opening;

a pair of parallel film edge guides located apart from each other a distance substantially equal to the width of the filmstrip to guide the filmstrip over the backframe opening; and a pair of leader edge guides located parallel to the film edge guides and apart from each other a distance less than the width of the wider leader, but greater than the distance separating the film edge guides, in order to make the wider leader be bent widthwise at opposite longitudinal edge portions of the wider leader between the film edge guides and the leader edge guides, whereby the wider leader is prevented from having to significantly increase the size of the one-time-use camera.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
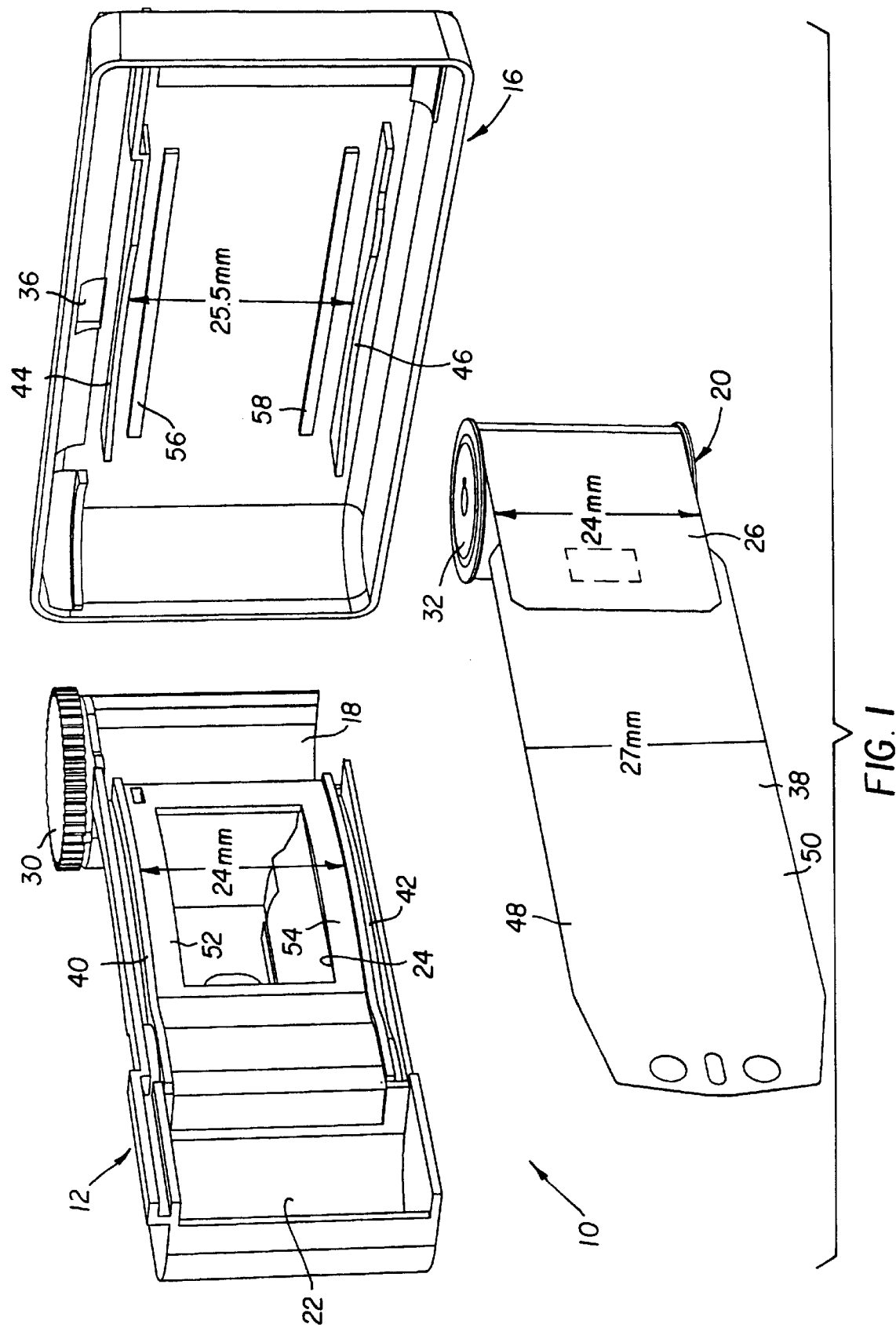
FIG. 1 is an exploded rear perspective view of a one-time-use camera with a filmstrip having a wider film leader, according to a preferred embodiment of the invention.
Figure 2:
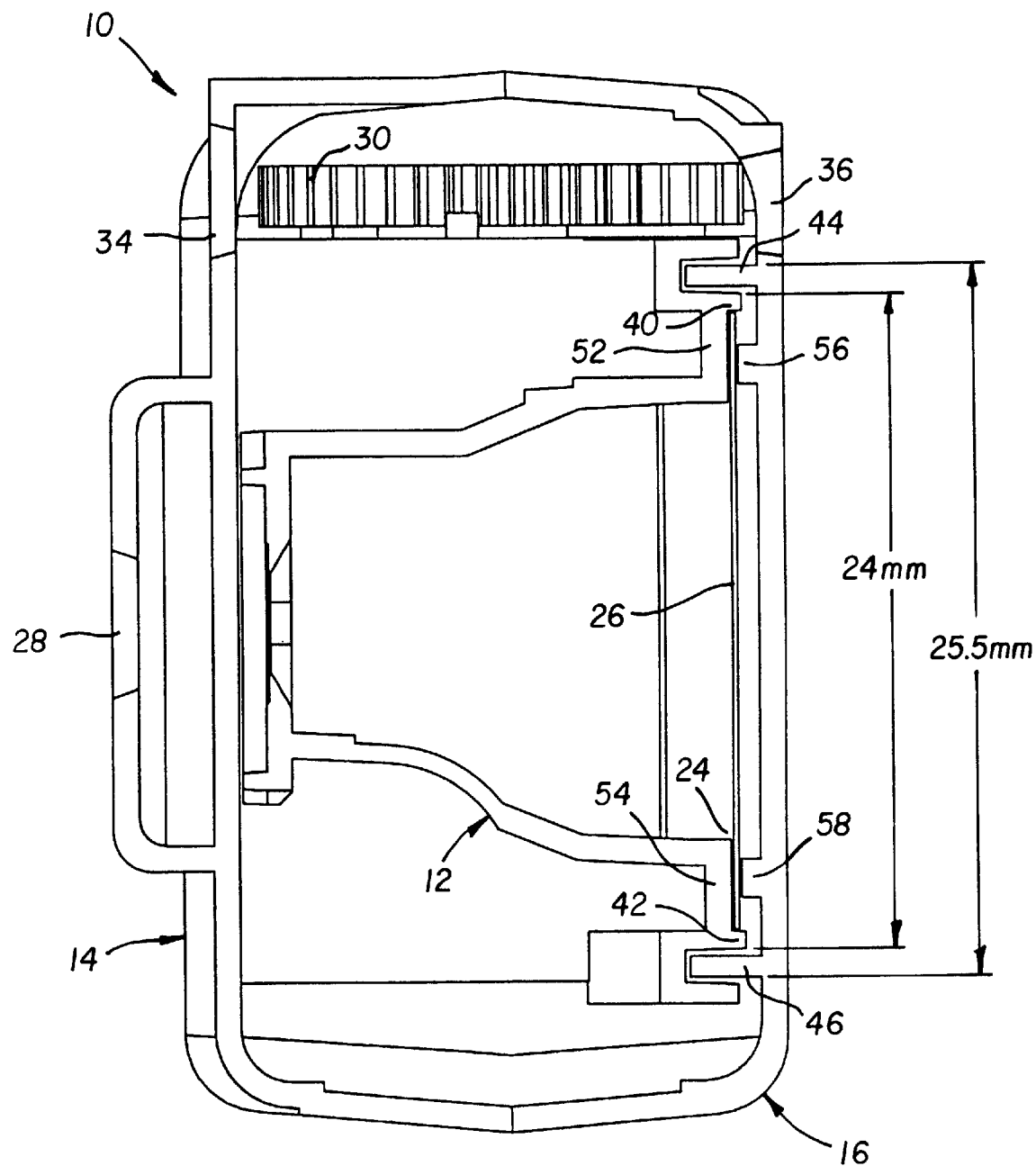
FIG. 2 is an elevation side section view of the camera, showing the filmstrip.
Figure 3:
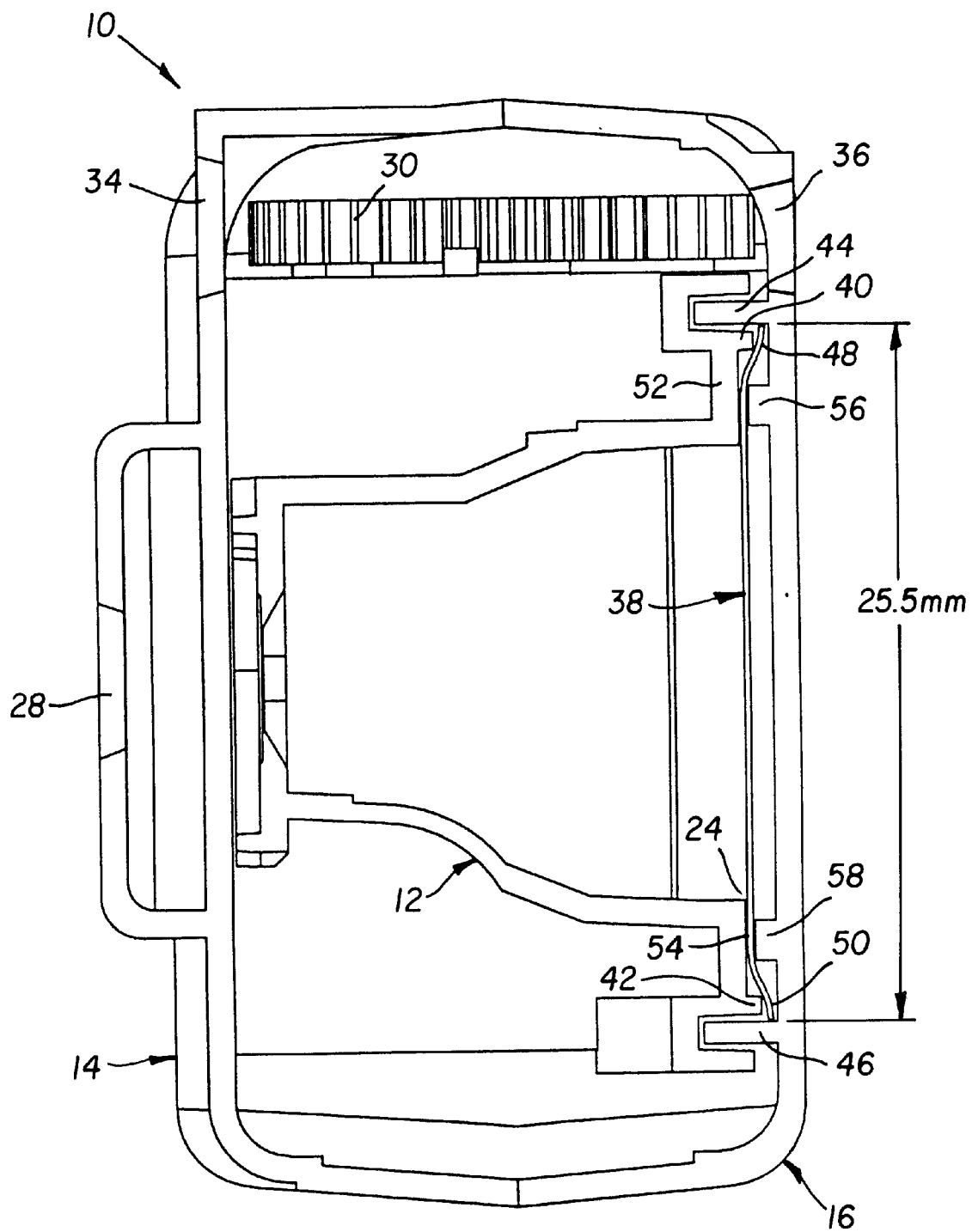
FIG. 3 is an elevation section view of the camera, showing the wider leader.

Referring now to the drawings, FIGS. 1–3 show a one-time-use camera 10 including an opaque main body part 12 and a pair of opaque front and rear cover parts 14 and 16 which house the main body part between them.

The main body part 12 has a rearwardly open film take-up chamber 18 for a flanged film spool 20 and a rearwardly open film supply chamber 22 for an unexposed film roll (not shown). A backframe 24 is located between the film take-up and film supply chambers 18 and 22 for exposing successive image areas of a filmstrip 26 initially stored on the unexposed film roll in the film supply chamber. The backframe opening 24 is optically aligned with a front lens opening 28 in the front cover part 14. A film winding thumbwheel 30 is rotatably supported on the main body part 12 and has a depending coaxial stem (not shown) in coaxial engagement with one end 32 of the film spool 20 in the film take-up chamber 18. Winding rotation of the film winding thumbwheel 30 (counterclockwise in FIG. 1) similarly rotates the film spool 20 to wind each exposed image area of the filmstrip 26 onto the film spool.

As shown in FIG. 2, the front and rear cover parts 14 and 16 have respective front and rear optically aligned viewfinder openings 34 and 36 for viewing a subject to be photographed.

The filmstrip 26 has a 24 mm width and is provided with a film leader 38 having a wider 27 mm width. See FIG. 1. The wider leader 38 is attached to the filmstrip 26 via a conventional means and is made wider in order to facilitate film processing.

A pair of parallel film edge guides 40 and 42 are located spaced from each other on the main body part 12 a distance equal to or very slightly greater than the width 24 mm of the filmstrip 26, in order to guide the filmstrip 26 over the backframe opening 24. See FIGS. 1 and 2.

A pair of leader edge guides 44 and 46 are located on the rear cover part 16 parallel to the film edge guides 40 and 42 and spaced from each other a distance 25.5 mm, which is less than the width 27 mm of the wider leader 38, but is greater than the distance 24 mm separating the film edge guides. This is done in order to make the wider leader 38 be bent widthwise at opposite longitudinal edge portions 48 and 50 of the wider leader between the film edge guides 40, 42 and the leader edge guides 44, 46. See FIG. 3. Thus, the wider leader 38 is prevented from having to significantly increase the size of the one-time-use camera 10.

A pair of parallel film support rails 52 and 54 are located along the main body part 12 between the backframe opening 24 and the film edge guides 40 and 42, and a pair of parallel film support rails 56 and 58 are located along the rear cover part 16 between the backframe opening and the leader edge guides 44 and 46 to directly face the film support rails along the main body part. See FIGS. 1–3. The film support rails 56 and 58 project from the rear cover part 16 to space the filmstrip 26 from the rear cover part in the vicinity of the backframe opening 24, and they project between the backframe opening 24 and the film edge guides 40 and 42 to permit those film edge guides to bend the widened leader 38 widthwise at its longitudinal edge portions 48 and 50 towards the rear cover part. See FIG. 3. The film edge guides 40, 42 and the leader edge guides 44, 46 project alongside each other to provide a light-locking labyrinth as shown in FIGS. 2 and 3.

The invention has been described with reference to a preferred embodiment. However, it will be appreciated that variations and modifications can be effected by a person of ordinary skill in the art without departing from the scope of the invention. For example, the leader edge guides 44 and 46 could be located on the main body part 12.

PARTS LIST

| | |
|---|---|
| 10. | one-time-use camera |
| 12. | main body part |
| 14. | front cover part |
| 16. | rear cover part |
| 18. | film take-up chamber |
| 20. | film spool |
| 22. | film supply chamber |
| 24. | backframe opening |
| 26. | filmstrip |
| 28. | front lens opening |
| 30. | thumbwheel |
| 32. | spool end |
| 34. | front viewfinder opening |
| 36. | rear viewfinder opening |
| 38. | wider leader |
| 40. | film edge guide |
| 42. | film edge guide |
| 44. | leader edge guide |
| 46. | leader edge guide |
| 48. | longitudinal edge portion |
| 50. | longitudinal edge portion |
| 52. | film support rail |
| 54. | film support rail |
| 56. | film support rail |
| 58. | film support rail |

What is claimed is:

1. A one-time-use camera comprising:

a filmstrip having a certain width and a film leader for said filmstrip having another width that is greater than the width of said filmstrip;

a film-exposure backframe opening;

a pair of parallel film edge guides located apart from each other a distance substantially equal to the width of said filmstrip to guide said filmstrip over said backframe opening; and a pair of leader edge guides located parallel to said film edge guides and apart from each other a distance less than the width of said wider leader, but greater than said distance separating said film edge guides, in order to make said wider leader be bent widthwise at opposite longitudinal edge portions of the wider leader between said film edge guides and said leader edge guides, whereby said wider leader is prevented from having to significantly increase the size of said one-time-use camera.

2. A one-time-use camera as recited in claim 1, wherein a rear cover part is located opposite said backframe opening and has a pair of parallel film support rails that project from said rear cover part to space said filmstrip from the rear cover part in the vicinity of the backframe opening.

3. A one-time-use camera as recited in claim 2, wherein said film support rails project from said rear cover part between said backframe opening and said film edge guides to permit said film edge guides to bend said widened leader widthwise at said longitudinal edge portions towards said rear cover part.

4. A one-time-use camera as recited in claim 1, wherein said film edge guides and said leader edge guides project alongside each other to provide a light-locking labyrinth.

5. A one-time-use camera as recited in claim 1, wherein a main body part has said backframe opening and said film edge guides, a rear cover part has said leader edge guides, a pair of parallel film support rails are located along said main body part between said backframe opening and said film edge guides, and a pair of parallel film support rails are located along said rear cover part between said backframe opening and said leader edge guides to directly face said film support rails along said main body part.

6. A method of using a camera with a filmstrip having a certain width and a film leader for the filmstrip having another width that is greater than the width of the filmstrip, said method comprising the steps:

guiding the filmstrip over a film-exposure backframe opening, between a pair of parallel film edge guides located apart from each other a distance substantially equal to the width of the filmstrip; and bending the wider leader widthwise at opposite longitudinal edge portions of the wider leader between the film edge guides and a pair of leader edge guides located parallel to the film edge guides and apart from each other a distance less than the width of the wider leader, but greater than the distance separating the film edge guides.

* * * * *